(12) United States Patent
Lee et al.

(10) Patent No.: US 7,470,486 B2
(45) Date of Patent: Dec. 30, 2008

(54) LITHIUM SECONDARY BATTERY

(75) Inventors: Jaesung Lee, Yongin-si (KR);
Seok-Gyun Chang, Yongin-si (KR);
Jeunghun Park, Yongin-si (KR);
Jungseog Kim, Yongin-si (KR); Yooeup Hyung, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 92 days.

(21) Appl. No.: 11/485,166

(22) Filed: Jul. 11, 2006

(65) Prior Publication Data
US 2007/0020515 A1 Jan. 25, 2007

(30) Foreign Application Priority Data
Jul. 12, 2005 (KR) .................. 10-2005-0062590

(51) Int. Cl.
*H01M 2/16* (2006.01)
*H01M 2/14* (2006.01)
*H01M 2/02* (2006.01)

(52) U.S. Cl. .................. 429/143; 429/129; 429/164

(58) Field of Classification Search .................. 429/51, 429/74, 129, 130, 142, 143, 146, 147
See application file for complete search history.

(56) References Cited

U.S. PATENT DOCUMENTS

| | | | | |
|---|---|---|---|---|
| 5,525,437 A | * | 6/1996 | Freluche et al. | 429/72 |
| 5,776,630 A | * | 7/1998 | Bohnstedt | 429/143 |
| 2006/0081530 A1 | * | 4/2006 | Beard | 210/500.27 |

FOREIGN PATENT DOCUMENTS

JP  2004111105 A  *  4/2004

* cited by examiner

*Primary Examiner*—Patrick Ryan
*Assistant Examiner*—Muhammad Siddiquee
(74) *Attorney, Agent, or Firm*—Christie, Parker & Hale, LLP (57) ABSTRACT

A lithium secondary battery, in which electrolyte impregnation capability is improved, even in the case of a high-density electrode assembly, by forming a bottom insulator plate with a structure to facilitate the impregnation of the electrode assembly with an electrolyte. The bottom insulator plate may be formed with a plurality of holes in the form of a mesh, and the holes are defined by a plurality of protrusions with differing heights to improve the electrolyte impregnation capability. Alternatively, the bottom insulator plate may be formed with a central hole and a plurality of peripheral holes radially arranged around the central hole in an aperture ratio to improve the electrolyte impregnation capability.

19 Claims, 4 Drawing Sheets

LITHIUM SECONDARY BATTERY

CROSS-REFERENCE TO RELATED APPLICATION

This application claims priority to and the benefit of Korean Patent Application No. 10-2005-0062590, filed Jul. 12, 2005, the entire content of which is incorporated herein by reference.

BACKGROUND OF THE INVENTION

1. Field of the Invention

The present invention relates to a lithium secondary battery and, more particularly, to a lithium secondary battery, in which electrolyte impregnation capability is improved to enhance the mobility of the electrolyte.

2. Description of the Prior Art

Recently, a large number of compact and lightweight electrical/electronic appliances, such as cellular phones, notebooks, computers, etc., have been developed and produced. These electrical/electronic appliances are provided with battery packs so that they can operate in places without separate power sources. A battery pack includes at least one battery capable of outputting a given level of voltage to drive an electrical/electronic appliance for a certain period of time.

Due to economical efficiency reasons, a battery pack has been adapted to employ a rechargeable secondary battery. Non-limiting examples of secondary batteries include a nickel-cadmium battery, a nickel-hydrogen battery, and a lithium secondary battery, such as a lithium battery and a lithium ion battery.

In particular, since the lithium secondary battery has an operating voltage of 3.6V, which is three times higher than that of the nickel-cadmium battery or the nickel-hydrogen battery, and has a high energy density per unit weight, the demands for the lithium secondary battery have been rapidly expanded.

A lithium secondary battery may use lithium-based oxides as positive electrode active materials, and uses carbon materials as negative electrode active materials. In general, the lithium secondary battery may be classified into either a liquid electrolyte battery or a polyelectrolyte battery according to the type of the electrolyte used. A lithium secondary battery using the liquid electrolyte is referred to as a lithium ion battery, and a lithium secondary battery using the polyelectrolyte is referred to as a lithium polymer battery. The lithium secondary battery may also be fabricated into various shapes. According to the shapes, the lithium secondary battery may be a cylinder type battery, a square type battery, or a pouch type battery.

The cylinder type lithium secondary battery usually includes an electrode assembly. The electrode assembly includes a positive electrode plate coated with positive electrode active materials, a negative electrode plate coated with negative electrode active materials, and a separator positioned between the positive electrode plate and the negative electrode plate to prevent a short circuit between the two electrode plates and to allow only lithium ions to pass through. The positive electrode plate, the negative electrode plate, and the separator of the electrode assembly are rolled up in an approximately cylindrical shape and inserted into a cylindrical case, and an electrolyte is injected into the cylindrical case to enable the lithium ions to migrate.

Before the electrode assembly is inserted into the cylindrical case, a bottom insulator plate is inserted first so as to provide insulation between the electrode assembly and the cylindrical case. Also, after the electrode assembly is inserted but before the cylindrical case is sealed with a cap assembly, a top insulator plate is inserted so as to provide insulation between the electrode assembly and the cap assembly.

Similarly, in a square type lithium secondary battery, an insulator case (or plate) for supporting a cap assembly and providing insulation between a terminal plate and an electrode assembly, and a bottom insulator plate for providing insulation between a square case and the electrode assembly are inserted into the square case.

Since bottom insulator plates are usually made of polyethylene (PE) or polypropylene (PP), they have no affinity with an electrolyte. This hinders the electrolyte from being sufficiently impregnated into an electrode assembly. In the structure of an existing bottom insulator plate with a center pin, a central hole may be formed to abut one end of the center pin so that there is not enough room for impregnating the electrolyte into the electrode assembly. In the case of a battery not having the center pin, no hole is formed. Further, the bottom insulator plate is in close contact with the electrode assembly, which also acts as a hindrance to the impregnation of the electrode assembly with the electrolyte.

Moreover, as current trends are moving toward high capacity batteries, an electrode assembly is becoming more dense, and thus its outer diameter is becoming larger. As the outer diameter of the electrode assembly becomes larger, a space between a case and the electrode assembly is reduced, which makes it more difficult to impregnate an electrolyte into the electrode assembly. As such, there is a need to form a bottom insulator plate in such a manner that the electrolyte can be easily impregnated into the electrode assembly.

SUMMARY OF THE INVENTION

Accordingly, an aspect of the present invention provides a lithium secondary battery, in which electrolyte impregnation capability is improved, even in the case of a high-density electrode assembly, by forming a bottom insulator plate with a structure to facilitate the impregnation of the electrode assembly with an electrolyte.

An aspect of the present invention provides a lithium secondary battery with a bottom insulator plate that is formed with a plurality of holes in the form of a mesh, and the holes are defined by a plurality of protrusions with differing heights to improve the electrolyte impregnation capability.

An aspect of the present invention provides a lithium secondary battery with a bottom insulator plate that is formed with a central hole and a plurality of peripheral holes radially arranged around the central hole in an aperture ratio to improve the electrolyte impregnation capability.

In an embodiment of the present invention, a lithium secondary battery includes: an electrode assembly; a can for accommodating the electrode assembly; a cap assembly for sealing a top opening of the can; and a bottom insulator plate positioned between a lower portion of the electrode assembly and the can, wherein the bottom insulator plate includes a plurality of holes and has an aperture ratio ranging from about 5 to 80%.

In one embodiment, the aperture ratio ranges from about 20 to 50%.

In one embodiment, the plurality of holes include a central hole formed in a central portion of the bottom insulator plate, and peripheral holes radially arranged around the central hole.

In one embodiment, the central hole has a diameter ranging from about 2 to 4 mm.

In one embodiment, each of the peripheral holes has a diameter ranging from about 1.5 to 3.5 mm.

In one embodiment, the peripheral holes lie approximately halfway between the central hole and a circumference of the bottom insulator plate.

In one embodiment, the plurality of holes are defined by a plurality of protrusions arranged orthogonal to each other to create a mesh shape.

In one embodiment, the protrusions have different heights according to locations thereof.

In one embodiment, the protrusions include first protrusions extending parallel to each other in one direction, and second protrusions orthogonal to the first protrusions.

In one embodiment, the first protrusions include first higher protrusions having a first height substantially equal to the height of the bottom insulator plate, and first lower protrusions having a second height less than the first height of the first higher protrusions.

In one embodiment, the first higher protrusions are arranged alternately with the first lower protrusions.

In one embodiment, the second protrusions are of the same height.

In one embodiment, the second protrusions have a third height, and the third height is less than the second height of the first lower protrusions so as to enable an electrolyte to flow in a direction perpendicular to the second protrusions.

In one embodiment, the bottom insulator plate is made of polyethylene (PE) or polypropylene (PP).

In one embodiment, the bottom insulator plate is a compressed non-woven fabric.

In one embodiment, surfaces of the bottom insulator plate are coated with polyvinylidene difluoride (PVdF).

In one embodiment, the PVdF includes a material selected from the group consisting of PVdF 761, PVdF 2801, and a mixture of PVdF 761 and PVdF 2801.

In one embodiment, surfaces of the bottom insulator plate are coated with a material containing an ester group or a carboxylic group.

In another embodiment of the present invention, a lithium secondary battery includes: an electrode assembly; a can for accommodating the electrode assembly; a cap assembly for sealing a top opening of the can; and a bottom insulator plate positioned between a lower portion of the electrode assembly and the can, wherein the bottom insulator plate comprises a plurality of holes and a plurality of protrusions with differing heights and defining the plurality of holes to form a mesh.

In another embodiment of the present invention, a lithium secondary battery includes: an electrode assembly; a can for accommodating the electrode assembly; a cap assembly for sealing a top opening of the can; and a bottom insulator plate positioned between a lower portion of the electrode assembly and the can, wherein the bottom insulator plate comprises a central hole and a plurality of peripheral holes radially arranged around the central hole and has an aperture ratio to improve an electrolyte impregnation capability.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
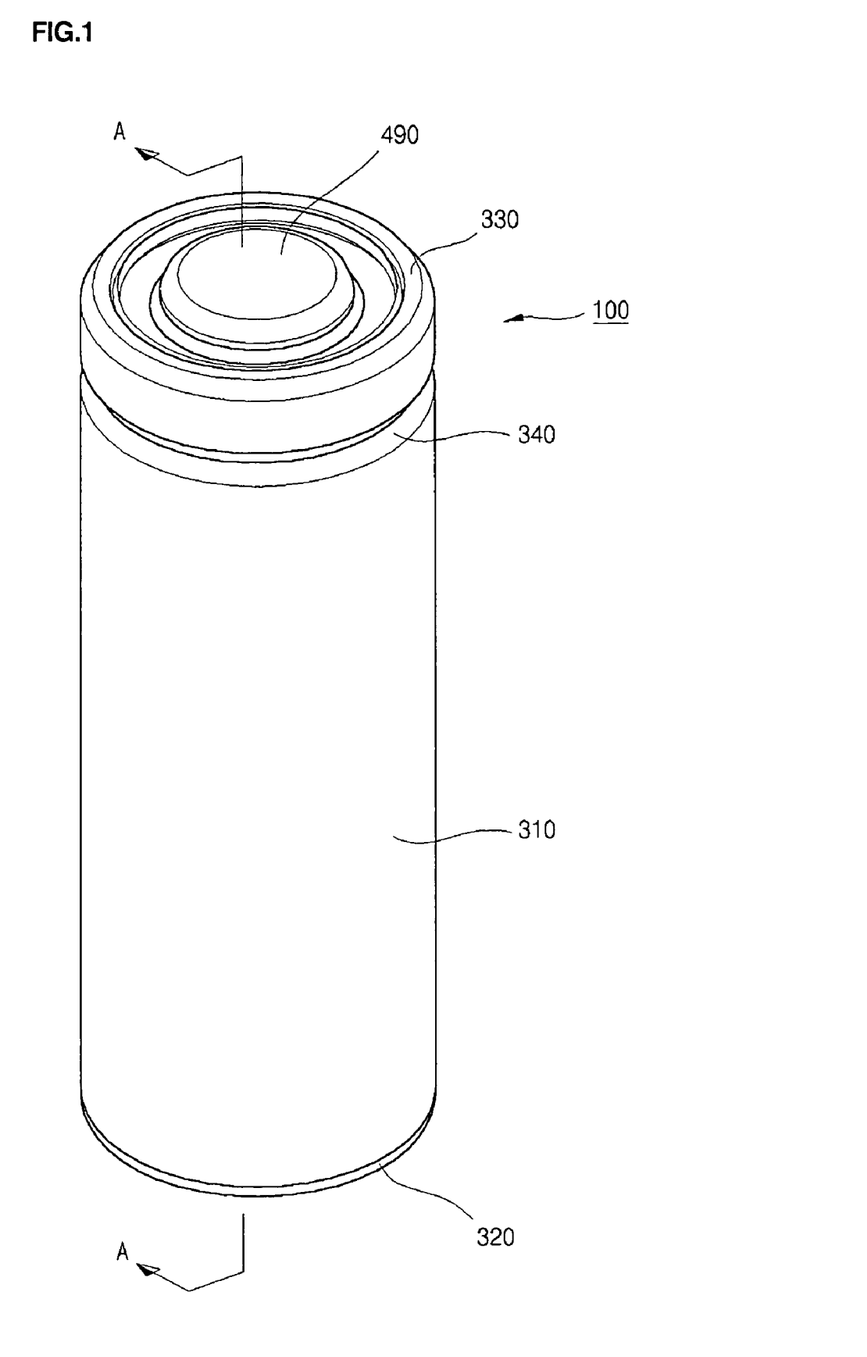
FIG. 1 is a perspective view of a cylinder type lithium secondary battery in accordance with an embodiment of the present invention.
Figure 2:
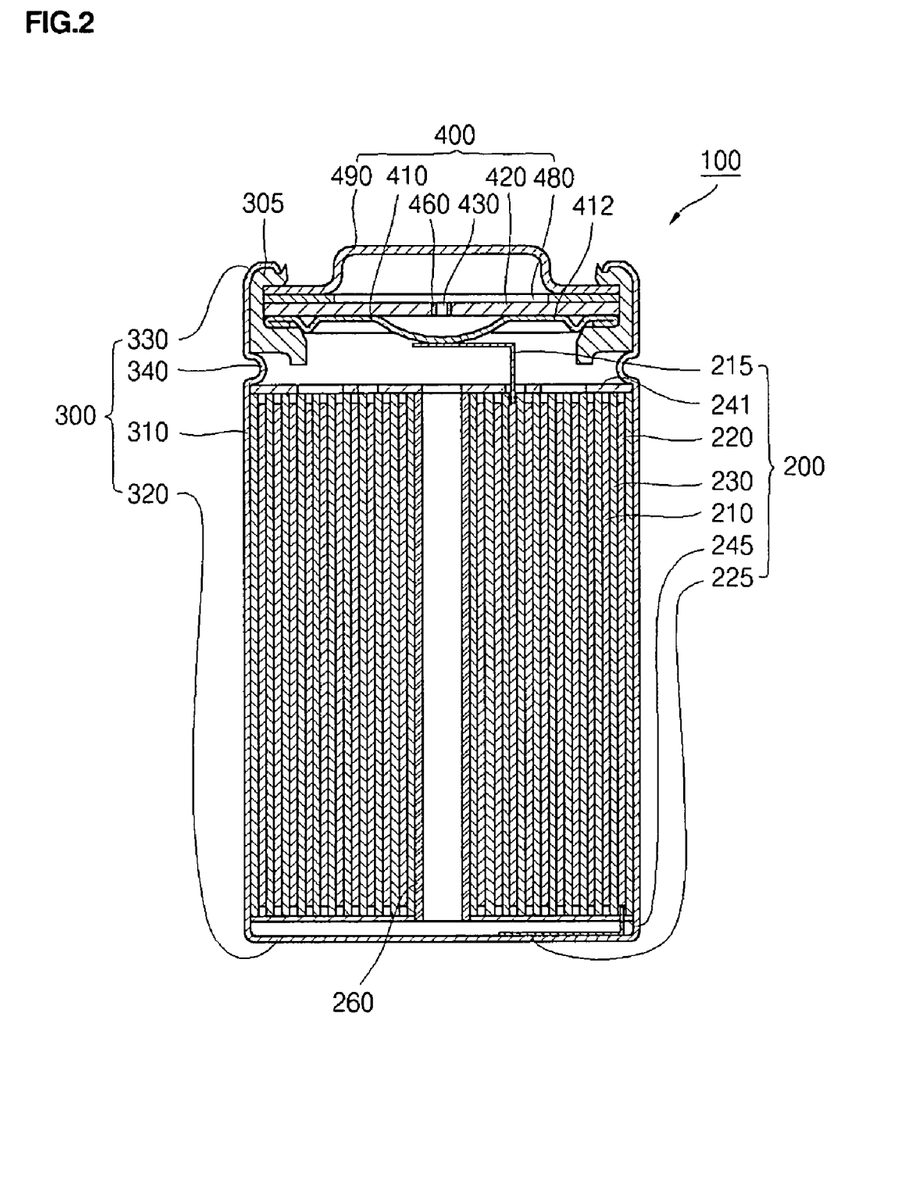
FIG. 2 is a sectional view of the second battery taken along line A-A in FIG. 1.

FIG. 1 illustrates a perspective view of a cylinder type lithium secondary battery 100 in accordance with an embodiment of the present invention, and FIG. 2 illustrates a sectional view of the battery 100 taken along line A-A in FIG. 1. Herein, although a description is provided for the cylinder type lithium secondary battery 100, the present invention is not thereby limited and may be applied to a square type lithium secondary battery.

Referring to FIGS. 1 and 2, the cylinder type lithium secondary battery 100 includes an electrode assembly 200, a cylindrical can 300 for accommodating the electrode assembly 200 and an electrolyte, and a cap assembly 400 assembled in an upper portion of the cylindrical can 300 for sealing the cylindrical can 300 and allowing an electric current generated in the electrode assembly 300 to flow into an external appliance.

Referring to FIG. 2, the electrode assembly 200 includes a positive electrode plate 210 having a positive electrode collector, the overall surface of which is coated with positive electrode active materials; a negative electrode plate 220 having a negative electrode collector, the overall surface of which is coated with negative electrode active materials; and a separator 230 positioned between the positive electrode plate 210 and the negative electrode plate 220 for electrically insulating the positive and negative electrode plates 220, 230 from each other. The electrode assembly 200 is formed in such a manner that the positive electrode plate 210, the negative electrode plate 220, and the separator 230 are rolled up together into a shape of a roll.

The positive electrode plate 210 includes the positive electrode collector made of a metal sheet with high electrical conductivity, such as an aluminum (Al) foil, and the positive electrode active materials are coated on both sides of the positive electrode collector. Both distal ends of the positive electrode plate 210 are respectively formed with a positive electrode collector free region that is free of the positive electrode materials, that is, a positive electrode uncoated portion. A positive electrode tab 215, which is generally made of aluminum (Al) and protrudes out of (or above) the electrode assembly 200 by a given length, is bonded to one of the positive electrode uncoated portions.

Further, the negative electrode 220 includes the negative electrode collector made of an electrically conductive metal sheet such as an aluminum (Al) foil or a copper (Cu) foil, and the negative electrode active materials coated on both sides of the negative electrode collector. Both distal ends of the negative electrode plate 220 are respectively formed with a negative electrode collector region free of the negative electrode materials, that is, a negative electrode uncoated portion. A negative electrode tab 225, which is generally made of nickel (Ni) and protrudes out of (or below) the electrode assembly 200 by a given length, is bonded to one of the negative electrode uncoated portions. Also, top and bottom insulator plates 241, 245 for preventing the electrode assembly 200 from being contacted with the cap assembly 400 or the cylindrical can 300 are further included in upper and lower portions of the electrode assembly 200, respectively.

Referring still to FIG. 2, the top insulator plate 241 is positioned between the cap assembly 400, in particular, between a safety vent 410 and the upper portion of the electrode assembly 200. The top insulator plate 241 prevents a short circuit, which may occur between the electrode assembly 200 and the cap assembly 400. The safety vent 410 of the cap assembly is electrically connected to an electrode tab, for example, the positive electrode tab 215. The top insulator plate 241 may be formed with one or more holes, such as a settling passage hole for an injected electrolyte; an electrode tab hole functioning as a passage through which an electrode tab (e.g., the positive electrode tab 215) comes out of the electrode assembly 220; and/or a central hole, which abuts with one end of a center pin in an embodiment having the center pin.

Figure 3:
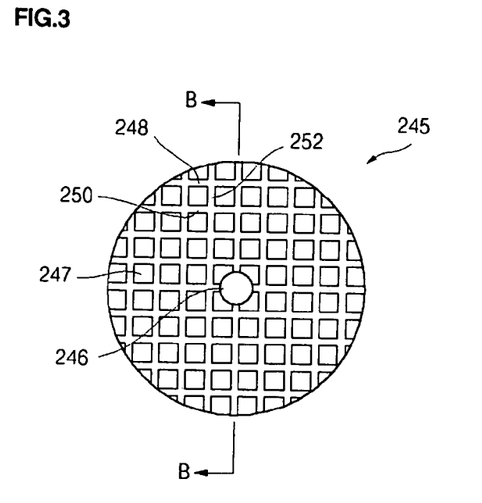
FIG. 3 is a plan view of a bottom insulator plate in accordance with an embodiment of the present invention.
Figure 4:
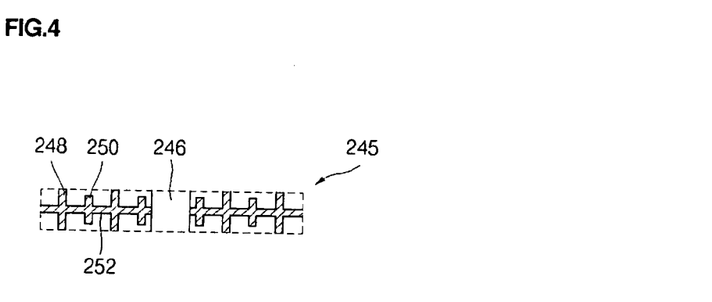
FIG. 4 is a sectional view of the bottom insulator plate taken along line B-B in FIG. 3.
Figure 5:
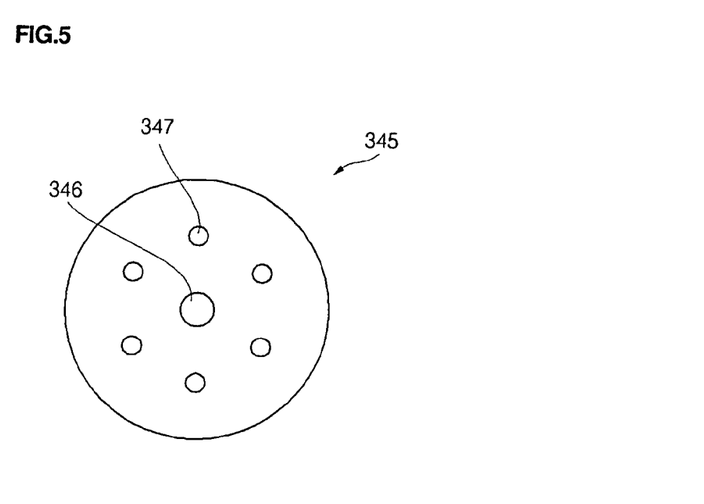
FIG. 5 is a plan view of a bottom insulator plate in accordance with another embodiment of the present invention.

FIG. 3 illustrates a plan view of the bottom insulator plate 245 formed with a plurality of holes 246, 247 in the form of a mesh in accordance with an embodiment of the present invention, FIG. 4 illustrates a sectional view of the bottom insulator plate 245 taken along line B-B in FIG. 3, and FIG. 5 illustrates a plan view of a bottom insulator plate 345 in accordance with another embodiment of the present invention.

Referring to FIGS. 2 to 5, the bottom insulator plate 245, 345 is (or can be) positioned between a bottom plate 320 of the can 300 and the lower portion of the electrode assembly 200. The bottom insulator plate 245, 345 prevents short circuits, which may occur between the electrode assembly 200 and the can 300. The bottom plate 320 is electrically connected to an electrode tab, for example, the negative electrode tab 225. The bottom insulator plate 245, 345 is formed with a central hole 246, 346 which abuts (or adjoins) one end of a center pin in an embodiment having the center pin.

The bottom insulator plate 245, 345 may be formed with the plurality of holes 246, 247, 346, 347 to have an aperture ratio ranging from 5 to 80%. Here, the aperture ratio refers to a ratio of area occupied by hole(s) with respect to the overall area of an upper surface of the bottom insulator plate. In one embodiment, the aperture ratio is designed with the consideration that, as aperture ratio goes up, an electrolyte impregnation rate of the bottom insulator plate 245, 345 increases, but a mechanical strength of the bottom insulator plate 245, 345 becomes weaker.

The bottom insulator plate 245, 345 may have an aperture ratio ranging from 5 to 80%. In one embodiment, the bottom insulator plate 245, 345 has an aperture ratio that ranges from 20 to 50%. If the aperture ratio of the bottom insulator plate 245, 345 is less than 5%, there is a problem in that the electrolyte impregnation rate is too low (or is decreased too much); if the aperture ratio of the bottom insulator plate 245, 345 exceeds 80%, there is a problem in that the holes occupy too much area, which results in a weakening of the strength of the bottom insulator plate 245, 345. Table 1 represents an example in which an aperture ratio is derived from diameter, radius, upper surface area, etc., measured for a bottom insulator plate that is substantially the same as the bottom insulator plate 345 according to the embodiment illustrated in FIG. 5.

TABLE 1

|  | diameter (mm) | radius (mm) | surface area (mm²) |
| --- | --- | --- | --- |
| bottom insulator plate overall | 16.9 | 8.45 | 224.2 |
| central hole | 2.97 | 1.485 | 6.9 |
| peripheral hole | 2.5 | 1.25 | 4.9 |

The area of one central hole 346 is 6.9 mm², and the area of six peripheral holes (e.g., six peripheral holes 347) is 4.9 mm²×6=29.4 mm² Thus, the overall area of the aperture (or hole) portions is calculated as 6.9 mm²+29.4 mm²=36.3 mm². Since the overall upper surface area of the bottom insulator plate 345 is 224.2 mm², the aperture ratio becomes 36.3/224.2≈0.16, that is, about 16%.

It should be apparent to those skilled in the art that the above numerical value is only provided as an example, and the present invention is not thereby limited.

Figure 6:
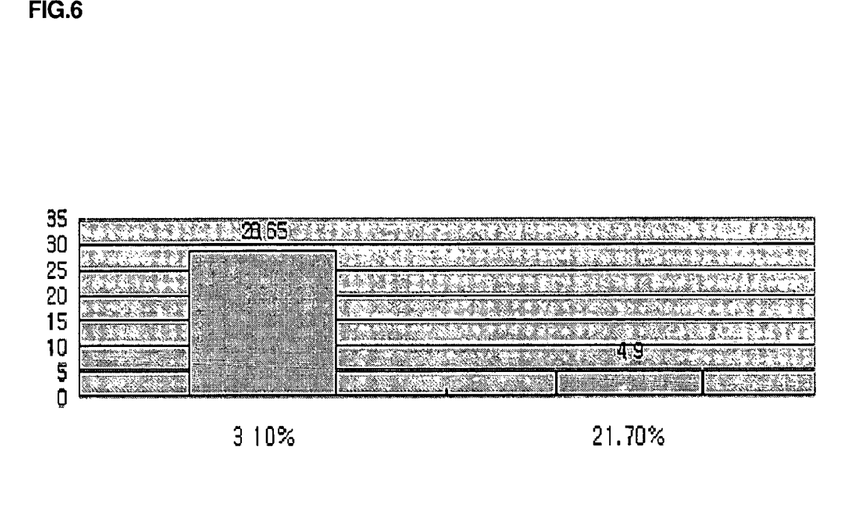
FIG. 6 is a graph illustrating a relation between aperture ratio and impregnation rate in accordance with an embodiment of the present invention.

Meanwhile, an electrolyte impregnation time was measured according to the aperture ratio of the bottom insulator plate 245, 345, the result of which is illustrated in FIG. 6. In FIG. 6, the abscissa axis indicates the aperture ratio in %, and the ordinate axis indicates the impregnation time in minute. Here, the impregnation time represents natural impregnation time measured without applying a vacuum. In such a test, the impregnation time was measured for two aperture ratios of 3.10% and 21.70%.

Referring to FIG. 6, an impregnation time of 28.65 minutes is spent in the case where the aperture ratio is 3.10%, and an impregnation time of 4.9 minutes is spent in the case where the aperture ratio is 21.70%. That is, it has been revealed that the impregnation time is reduced to ⅙ as the aperture ratio increases from about 3% to about 22%. Thus, it can be seen that increasing the aperture ratio with some loss in mechanical strength (e.g., providing a certain minimum amount of required mechanical strength) is advantageous for improving the electrolyte impregnation capability (i.e., the bottom insulator improves the electrolyte impregnation capability while still maintaining a certain amount of mechanical strength).

Referring to FIGS. 3 and 4, the bottom insulator plate 245 according to an embodiment of the present invention is formed with the plurality of holes 247. The plurality of holes 247 are defined by (or formed between) protrusions 248, 250, 252, which are orthogonal to each other, in such a manner that the holes 247 together with the protrusions 248, 250, 252 create a mesh shape. Thus, if an electrolyte is injected into the can 300, it settles into the battery 100 through the many holes 247 formed in the bottom insulator plate 245. The present invention is not limited by the size of each of the holes 247 as long as a short circuit between the electrode assembly 220 and the bottom plate 320 can be prevented. Also, the number of the holes 247 is inversely proportional to the size of each of the holes 247. That is, the larger the size of each of the holes 247, the fewer the number of the holes 247 can be.

The protrusions 248, 250, 252 have different heights according to their locations, and include first protrusions 248, 250 extending parallel to each other in one direction, and second protrusions 252 that are orthogonal to the first protrusions 248, 250. Hereinafter, merely for the convenience of explanation, a description will be developed by instancing (or exemplifying) one of the plurality of first protrusions 248, 250 formed parallel to each other, and one of the plurality of second protrusions 252 formed parallel to each other.

The one of the first protrusions 248, 250 includes a first higher protrusion 248 having a first height that may be equal to the height of the bottom insulator plate 245, and a first lower protrusion 250 having a second (or constant) height that is less than the first height of the first higher protrusion 248. Here, the first higher protrusion 248 is arranged alternately with the first lower protrusion 250.

The one of the second protrusions 252 has the same height as the other second protrusions 252, and is so formed as to be lower than the first lower protrusion 250 so that an electrolyte can flow in a direction perpendicular to the second protrusion 252, that is, in a direction parallel to (or along with) the one of the first protrusions 248, 250.

If an electrolyte flows into the bottom insulator plate 245 having the above-mentioned structure, the electrolyte stagnates in a region between two of the first higher protrusions 248, in which one of the first lower protrusions 250 is included. Since the height of the first higher protrusion 248 corresponds to that of the bottom insulator plate 245, the electrolyte enters a space between the two first higher protrusions 248 and the lower portion of the bottom insulator plate 245.

Also, in one embodiment, the second protrusion 252 is so formed as to be lower than the first lower protrusion 250. This is because, when even a part of the electrolyte enters a space between the first higher protrusions 248, the electrolyte having entered the space between the first higher protrusion 248 can easily flow in a direction parallel to (or along with) the first protrusion 248, 250, that is, in a direction perpendicular to the second protrusion 252 due to the height of the second protrusion 252 being lower than that of the first lower protrusion 250. In this way, by differing the height of the protrusions 248, 250, 252, spaces functioning as passages of the electrolyte are sufficiently ensured.

In one embodiment, the bottom insulator plate 245 is made of a polyolefin-based resin such as polyethylene (PE), polypropylene (PP), polyamide (PA) and the like. Polyethylene (PE) has a low density, stretches easily because it does not develop a sufficient molecular orientation, and has high resistance to impact while having a low tensile strength. Thus, it can be easily worked (or formed) for use. Moreover, polyethylene (PE) has an excellent electrical insulation property because it is composed of only $CH^2$ groups, and polyethylene (PE) is also excellent as a high-frequency insulative material because it has symmetry with respect to carbon (C) chains as can be derived by its structural formula.

Polypropylene (PP) is produced together with ethylene when naphtha is decomposed. Polypropylene (PP) has an isotactic structure, and thus its structural formula exhibits a structure in which methyl groups are orderly arranged in the same direction. Polypropylene (PP) has high crystallinity before molding, but its crystallinity is lowered after molding. Electrical properties of polypropylene (PP) and polyamide (PA) are similar to those of polyethylene (PE).

However, the polyolefin-based resin, such as polyethylene (PE), polypropylene (PP) and so forth, has a poor affinity with non-aqueous electrolytes. This is because there is a significant difference between surface energy of non-aqueous electrolyte molecules and surface energy of molecules on a surface of the polyethylene (PE) or polypropylene (PP) material, and thus intermolecular bond formation is not easy. Consequently, when the electrolyte is contacted with the insulator plate made of polyethylene (PE) or polypropylene (PP), the wettability and the spreadability of the electrolyte is low because the electrolyte conglomerates in an approximately spherical shape.

According to an embodiment of the present invention, a material having a good affinity with an electrolyte is coated on a surface of a bottom insulator plate having a poor affinity with the electrolyte to thereby improve the electrolyte impregnation capability. Such a material having a good affinity with an electrolyte includes polyvinylidene difluoride (hereinafter referred to as "PVdF") from among high molecular substances. PVdF has a structure in which —CH2- CF-2 is repeated, and is a kind of fluorine (F) resin used as a binder when a collector is coated with electrode active materials. This fluorine resin is a synthetic resin having a structure in which a main-chain bond is similar to a C—C bond of polyolefin, but hydrogen of polyolefin is partially or completely substituted with a fluorine atom (F).

Experiments on the electrolyte impregnation capability have proven that, from among PVdF species, PVdF 761 and PVdF 2801 have particularly good wettability and spreadability for a non-aqueous electrolyte. Thus, in one embodiment, PVdF is used as a coating material of the bottom insulator plate, and includes any one of PVdF 761, PVdF, 2801, and a mixture of PVdF 761 and PVdF 2801.

In order to improve the wettability and the spreadability of an electrolyte, the bottom insulator plate may be coated with a PVdF material as stated above, or may be coated with a material containing a hydrophilic atom group such as an ester group or a carboxylic group, in place of the PVdF material.

The ester group is an atom group which constitutes an aliphatic compound expressed by RCOOR', and ester refers to a compound produced by a process in which alcohol or phenol reacts with organic or inorganic acid to lose water ($H_2O$), and then condense. In particular, inorganic acid ester such as sulfuric acid ester, nitric acid ester or the like is used as an organic solvent. The carboxylic group is an atom group which constitutes an aliphatic compound expressed by RCOOH, and includes benzoic acid and so forth.

Since a high molecular substance containing the ester or carboxylic group has a good affinity with a non-aqueous electrolyte, the wettability and the spreadability of the electrolyte can be improved when sulfuric acid ester or nitric acid ester containing the ester group or the carboxylic group is used as the coating material of the bottom insulator plate.

In this way, by coating the bottom insulator plate with a material having an affinity with an electrolyte, a surface of the bottom insulator plate does not exclude the electrolyte, and thus the settling speed and the electrolyte impregnation rate can be improved. Such a coating layer for the surface modification of the bottom insulator plate has a sufficient effect even in a thickness less than 1 μm, and can have a full effect even when it is applied as only a monolayer.

In the case where the bottom insulator plate is made of polyethylene (PE), etc., the bottom insulator plate may be worked in the form of a compressed non-woven fabric in order to supplement its poor affinity with an electrolyte. The non-woven fabric is a felt-shaped fabric fabricated by arranging fibers in a parallel direction or an indefinite direction, and bonding the arranged fibers together by using a synthetic resin adhesive or the like, and its liquid-absorbing property is good and comparable to a diaper, a wet towel and so on. Thus, by working the bottom insulator plate in the form of the non-woven fabric while using the existing material of the bottom insulator plate, such as polyethylene (PE) or polypropylene (PP), the electrolyte-absorbing ability of the bottom insulator plate is enhanced, which enables an electrolyte held in the bottom insulator plate to be impregnated into the electrode assembly.

Referring to FIG. 5, the bottom insulator plate 345 according to the another embodiment of the present invention is formed with the plurality of holes 346, 347. The plurality of holes 346, 347 include the central hole 346 and the peripheral holes 347 around the central hole 346.

The central hole 346 is formed in the central portion of the bottom insulator plate 345. The central hole 346 may be formed in a circular shape as illustrated in FIG. 5. Although not illustrated in the drawing, it should be apparent to those skilled in the art that the central hole 346 may be formed in an oval shape. Also, the central hole 346 may be formed to have a diameter ranging from 2 to 4 mm. However, this numerical value is presented only by way of example and may vary according to the design of the battery.

The peripheral holes 347 are formed such that they are radially arranged around (or to surround) the central hole 346. The peripheral holes 347 may be formed in a circular shape. Although not illustrated in the drawing, it should be apparent to those skilled in the art that the peripheral holes 347 may be formed in an oval shape. Also, each of the peripheral holes 347 is formed may be formed to have a diameter ranging from 1.5 to 3.5 mm. Further, the peripheral holes 346 may be formed in such a manner that six holes are radially arranged at intervals of 60 degrees as illustrated in FIG. 5. Although not illustrated in the drawing, the peripheral holes 347 may also be formed in such a manner that five holes are radially arranged at intervals of 72 degrees or eight holes are radially arranged at intervals of 45 degrees. These numerical values are also presented only by way of example and may vary according to the design of the battery. Further, in one embodiment, the peripheral holes 347 lie approximately halfway between the central hole 346 and a circumference of the bottom insulator plate 345. This is because the holes 346, 347 should be distributed as uniformly and widely as possible in order to evenly impregnate the whole battery with an electrolyte.

In addition, the bottom insulator plate 345 with the holes 346, 347 may have an aperture ratio ranging from 5 to 80%. In one embodiment, the bottom insulator plate 345 with the holes 346, 347 has an aperture ratio that ranges from 20 to 50%.

Referring back to FIG. 2, when the cylindrical can 300 includes a cylindrical side plate 310 having a certain diameter to define a given space for accommodating the cylindrical electrode assembly 200, and a bottom plate 320 for hermetically sealing a lower portion of the cylindrical side plate 310, an upper portion of the cylindrical side plate 310 has a top opening for inserting the electrode assembly 200 into the cylindrical case 300. The cylindrical can 300 itself serves as a negative electrode because the negative electrode tab 225 of the electrode assembly 200 is electrically coupled to a central portion of the bottom plate 320 of the cylindrical can 300. Further, in one embodiment, the cylindrical can 300 is made of aluminum (Al), iron (Fe) or an alloy thereof. Further, the cylindrical can 300 is formed with an inwardly bent crimping portion 330 for pressing downward an upper portion of the cap assembly 400 coupled to the top opening in the upper portion of the cylindrical can 300. The cylindrical can 300 is further formed, at a position downwardly apart from the crimping portion 330 by a distance corresponding to the thickness of the cap assembly 400, with an inwardly recessed beading portion 340 for pressing a lower portion of the cap assembly 400.

Referring still to FIG. 2, the cap assembly 400 includes the safety vent 410, a current cut-off structure 420, a secondary protective device 480, and a cap 490. The plate-like safety vent 410 is positioned in the lower portion of the cap assembly 400, and has a downward bulge in its central portion, which is to be deformed in an upward fashion by pressure generated within the lithium secondary battery. At a position (which may be predetermined) on a lower surface of the safety band, the electrode tab extended from one of the positive and negative electrode plates 210, 220, for example, the positive electrode tab 215 extended from the positive electrode plate 210, is electrically connected (or coupled or welded) to the lower surface of the safety vent 410, as a result of which the safety vent 410 is electrically connected to the positive electrode plate 210 of the electrode assembly 200. Here, the remaining positive or negative electrode plate 210, 220, e.g., the negative electrode plate 220, is electrically connected to the can 300 by the tab or in a direct contact manner.

As describe above, a structure capable of improving electrolyte settling velocity and electrolyte impregnation rate is provided to a bottom insulator plate that has a geometrical shape for fully covering the lower portion of a lithium secondary battery, thereby enhancing the mobility of an electrolyte. Thus, the electrolyte can be evenly impregnated and the electrolyte impregnation rate can be improved. As such, an impregnation process time that takes a greater part of the overall battery manufacturing time can be reduced, and thus productivity can also be improved.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A lithium secondary battery comprising:
   an electrode assembly;
   a can for accommodating the electrode assembly;
   a cap assembly for sealing a top opening of the can; and
   a bottom insulator plate positioned between a lower portion of the electrode assembly and the can,
   wherein the bottom insulator plate comprises a plurality of holes and has an aperture ratio ranging from about 5 to 80%, and
   wherein the plurality of holes are defined by a plurality of protrusions arranged orthogonal to each other to create a mesh shape.

2. The lithium secondary battery as claimed in claim 1, wherein the aperture ratio ranges from about 20 to 50%.

3. The lithium secondary battery as claimed in claim 1, wherein the plurality of holes include a central hole formed in a central portion of the bottom insulator plate, and peripheral holes radially arranged around the central hole.

4. The lithium secondary battery as claimed in claim 3, wherein the central hole has a diameter ranging from about 2 to 4 mm.

5. The lithium secondary battery as claimed in claim 3, wherein each of the peripheral holes has a diameter ranging from about 1.5 to 3.5 mm.

6. The lithium secondary battery as claimed in claim 3, wherein the peripheral holes lie approximately halfway between the central hole and a circumference of the bottom insulator plate.

7. The lithium secondary battery as claimed in claim 1, wherein the protrusions have different heights according to locations thereof.

8. The lithium secondary battery as claimed in claim 1, wherein the protrusions include first protrusions extending parallel to each other in one direction, and second protrusions orthogonal to the first protrusions.

9. The lithium secondary battery as claimed in claim 8, wherein the first protrusions comprise first higher protrusions having a first height substantially equal to the height of the bottom insulator plate, and first lower protrusions having a second height less than the first height of the first higher protrusions.

10. The lithium secondary battery as claimed in claim 9, wherein the first higher protrusions are arranged alternately with the first lower protrusions.

11. The lithium secondary battery as claimed in claim 8, wherein the second protrusions are of the same height.

12. The lithium secondary battery as claimed in claim 11, wherein the second protrusions have a third height, and wherein the third height is less than the second height of the first lower protrusions so as to enable an electrolyte to flow in a direction perpendicular to the second protrusions.

13. The lithium secondary battery as claimed in claim 1, wherein the bottom insulator plate is made of polyethylene (PE) or polypropylene (PP).

14. The lithium secondary battery as claimed in claim 13, wherein the bottom insulator plate is a compressed non-woven fabric.

15. The lithium secondary battery as claimed in claim 13, wherein surfaces of the bottom insulator plate are coated with polyvinylidene difluoride (PVdF).

16. The lithium secondary battery as claimed in claim 15, wherein the PVdF comprises a material selected from the group consisting of PVdF 761, PVdF 2801, and a mixture of PVdF 761 and PVdF 2801.

17. The lithium secondary battery as claimed in claim 13, wherein surfaces of the bottom insulator plate are coated with a material containing an ester group or a carboxylic group.

18. A lithium secondary battery comprising:
an electrode assembly;
a can for accommodating the electrode assembly;
a cap assembly for sealing a top opening of the can; and
a bottom insulator plate positioned between a lower portion of the electrode assembly and the can,
wherein the bottom insulator plate comprises a plurality of holes and a plurality of protrusions with differing heights and defining the plurality of holes to form a mesh,
wherein the protrusions comprise a plurality of first protrusions extending parallel to each other in a first direction, and a plurality of second protrusions extending parallel to each other in a second direction crossing the first protrusions,
wherein the first protrusions extending parallel to each other in the first direction comprise a plurality of higher protrusions and a plurality of lower protrusions, the higher and lower protrusions extending parallel to each other in the first direction, and
wherein the lower protrusions are lower in height than that of the higher protrusions.

19. A lithium secondary battery comprising:
an electrode assembly;
a can for accommodating the electrode assembly;
a cap assembly for sealing a top opening of the can; and
a bottom insulator plate positioned between a lower portion of the electrode assembly and the can,
wherein the bottom insulator plate comprises a central hole and a plurality of peripheral holes radially arranged around the central hole and has an aperture ratio to improve an electrolyte impregnation capability,
wherein the central hole is larger in area than any one of the peripheral holes,
wherein the central hole is a through-hole going though an entire thickness of the bottom insulator plate, and
wherein the peripheral holes do not go through the entire thickness of bottom insulator plate.

* * * * *